(12) United States Patent
Lin et al.

(10) Patent No.: US 10,387,110 B2
(45) Date of Patent: *Aug. 20, 2019

(54) SYNCHRONIZED AUDIO MIXING

(71) Applicant: Sonos, Inc., Santa Barbara, CA (US)

(72) Inventors: Ted M. Lin, Ayer, MA (US); Luis Vega, Arlington, MA (US)

(73) Assignee: SOHOS, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/935,966

(22) Filed: Mar. 26, 2018

(65) Prior Publication Data

US 2018/0285060 A1 Oct. 4, 2018

Related U.S. Application Data

(63) Continuation of application No. 15/607,507, filed on May 28, 2017, now Pat. No. 9,977,649, which is a
(Continued)

(51) Int. Cl.
*H04N 21/439* (2011.01)
*H04N 21/43* (2011.01)
(Continued)

(52) U.S. Cl.
CPC .............. *G06F 3/165* (2013.01); *G11B 27/10* (2013.01); *H04H 60/04* (2013.01); *H04J 3/0664* (2013.01);
(Continued)

(58) Field of Classification Search
CPC ......... G06F 3/165; G11B 27/10; H04H 60/04; H04J 3/0664; H04N 21/4305;
(Continued)

(56) References Cited

U.S. PATENT DOCUMENTS 5,228,093 A 7/1993 Agnello
5,440,644 A 8/1995 Farinelli et al.
(Continued)

FOREIGN PATENT DOCUMENTS

EP 1389853 A1 2/2004
EP 2079175 A2 7/2009
(Continued)

OTHER PUBLICATIONS

AudioTron Quick Start Guide, Version 1.0, Mar. 2001, 24 pages.
(Continued)

*Primary Examiner* — Sonia L Gay
(74) *Attorney, Agent, or Firm* — McDonnell Boehnen Hulbert & Berghoff LLP

(57) ABSTRACT

A first example playback device includes one or more processors and a non-transitory computer-readable medium storing instructions that, when executed by the one or more processors, cause the first playback device to perform functions. The functions include generating a mixed audio signal comprising one or more components of a first audio stream and one or more components of a second audio stream; and playing the mixed audio signal, where the one or more components of the second audio stream of the mixed audio signal played by the first playback device are played in synchrony with a second playback device configured to play the second audio stream. An example non-transitory computer-readable medium and an example method, both related to the first example playback device, are also disclosed herein.

28 Claims, 7 Drawing Sheets

Related U.S. Application Data continuation of application No. 14/617,604, filed on Feb. 9, 2015, now Pat. No. 9,665,341.

(51) Int. Cl.

| | |
|---|---|
| *H04N 21/436* | (2011.01) |
| *H04N 21/485* | (2011.01) |
| *H04R 27/00* | (2006.01) |
| *H04H 60/04* | (2008.01) |
| *G11B 27/10* | (2006.01) |
| *H04J 3/06* | (2006.01) |
| *G06F 3/16* | (2006.01) |

(52) U.S. Cl.
CPC ..... *H04N 21/4305* (2013.01); *H04N 21/4307* (2013.01); *H04N 21/439* (2013.01); *H04N 21/43615* (2013.01); *H04N 21/4852* (2013.01); *H04R 27/00* (2013.01); *H04R 2227/003* (2013.01); *H04R 2227/005* (2013.01)

(58) Field of Classification Search
CPC ......... H04N 21/4307; H04N 21/43615; H04N 21/439; H04N 21/4852; H04R 27/00; H04R 2227/003; H04R 2227/005
See application file for complete search history.

(56) References Cited

U.S. PATENT DOCUMENTS

| | | |
|---|---|---|
| 5,647,008 A | 7/1997 | Farhangi et al. |
| 5,761,320 A | 6/1998 | Farinelli et al. |
| 5,818,746 A | 10/1998 | Kentish |
| 5,923,902 A | 7/1999 | Inagaki |
| 6,032,202 A | 2/2000 | Lea et al. |
| 6,256,554 B1 | 7/2001 | DiLorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,158,488 B2 | 1/2007 | Fujimori |
| 7,236,773 B2 | 6/2007 | Thomas |
| 7,257,232 B2 | 8/2007 | Rudolph |
| 7,295,548 B2 | 11/2007 | Blank et al. |
| 7,391,791 B2 | 6/2008 | Balassanian et al. |
| 7,457,677 B2 | 11/2008 | Rudolph |
| 7,474,677 B2 | 1/2009 | Trott |
| 7,483,538 B2 | 1/2009 | McCarty et al. |
| 7,571,014 B1 | 8/2009 | Lambourne et al. |
| 7,577,419 B2 | 8/2009 | Alderson |
| 7,630,501 B2 | 12/2009 | Blank et al. |
| 7,631,119 B2 | 12/2009 | Moore et al. |
| 7,643,894 B2 | 1/2010 | Braithwaite et al. |
| 7,657,910 B1 | 2/2010 | McAulay et al. |
| 7,669,113 B1 | 2/2010 | Moore et al. |
| 7,765,315 B2 | 7/2010 | Batson et al. |
| 7,792,311 B1 | 9/2010 | Holmgren et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,015,306 B2 | 9/2011 | Bowman |
| 8,045,952 B2 | 10/2011 | Qureshey et al. |
| 8,103,009 B2 | 1/2012 | McCarty et al. |
| 8,185,674 B2 | 5/2012 | Moore et al. |
| 8,208,653 B2 | 6/2012 | Eo et al. |
| 8,233,648 B2 | 7/2012 | Sorek et al. |
| 8,234,395 B2 | 7/2012 | Millington et al. |
| 8,239,748 B1 | 8/2012 | Moore et al. |
| 8,316,147 B2 | 11/2012 | Batson et al. |
| 8,340,330 B2 | 12/2012 | Yoon et al. |
| 8,345,709 B2 | 1/2013 | Nitzpon et al. |
| 8,428,277 B1 | 4/2013 | Skoglund et al. |
| 8,432,851 B2 | 4/2013 | Xu et al. |
| 8,457,334 B2 | 6/2013 | Yoon et al. |
| 8,463,875 B2 | 6/2013 | Katz et al. |
| 8,483,853 B1 | 7/2013 | Lambourne |
| 8,509,211 B2 | 8/2013 | Trotter et al. |
| 8,520,870 B2 | 8/2013 | Sato et al. |
| 8,565,907 B2 | 10/2013 | Tu et al. |
| 8,615,091 B2 | 12/2013 | Terwal |
| 8,639,830 B2 | 1/2014 | Bowman |
| 8,683,009 B2 | 3/2014 | Ng et al. |
| 8,750,282 B2 | 6/2014 | Gelter et al. |
| 8,751,026 B2 | 6/2014 | Sato et al. |
| 8,904,066 B2 | 12/2014 | Moore et al. |
| 8,930,006 B2 | 1/2015 | Haatainen |
| 8,942,252 B2 | 1/2015 | Balassanian et al. |
| 9,313,591 B2 | 4/2016 | Sheen |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2003/0157951 A1 | 8/2003 | Hasty |
| 2004/0024478 A1 | 2/2004 | Hans et al. |
| 2004/0138873 A1* | 7/2004 | Heo ................. G11B 20/10527 704/201 |
| 2006/0247045 A1 | 11/2006 | Jeong et al. |
| 2007/0142944 A1 | 6/2007 | Goldberg et al. |
| 2008/0212786 A1 | 9/2008 | Park |
| 2009/0100189 A1 | 4/2009 | Bahren et al. |
| 2010/0142730 A1 | 6/2010 | Lindahl et al. |
| 2012/0237054 A1 | 9/2012 | Eo et al. |
| 2013/0038726 A1 | 2/2013 | Kim |
| 2013/0268692 A1 | 10/2013 | Williams et al. |
| 2013/0342639 A1 | 12/2013 | Bodilis et al. |
| 2014/0010515 A1 | 1/2014 | Lee et al. |
| 2014/0046464 A1 | 2/2014 | Reimann |
| 2014/0213227 A1 | 7/2014 | Rao |
| 2014/0323036 A1 | 10/2014 | Daley et al. |
| 2015/0049248 A1 | 2/2015 | Wang et al. |
| 2015/0063774 A1 | 3/2015 | Brown, Jr. et al. |
| 2015/0098576 A1 | 4/2015 | Sundaresan et al. |
| 2015/0148928 A1 | 5/2015 | Malsbary et al. |
| 2016/0165558 A1* | 6/2016 | Kafle ................. H04L 65/4069 370/350 |

FOREIGN PATENT DOCUMENTS

| | | |
|---|---|---|
| GB | 2486183 | 6/2012 |
| WO | 200153994 | 7/2001 |
| WO | 2003093950 A2 | 11/2003 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Final Office Action dated Jan. 10, 2017, issued in connection with U.S. Appl. No. 14/617,604, filed Feb. 9, 2015, 15 pages.
International Searching Authority, International Search Report and Written Opinion dated Jul. 12, 2016, issued in connection with International Application No. PCT/US2016/017007, filed on Feb. 8, 2016, 16 pages.
Jo et al., "Synchronized One-to-many Media Streaming with Adaptive Playout Control," Proceedings of SPIE, 2002, pp. 71-82, vol. 4861.

(56) References Cited

OTHER PUBLICATIONS

Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Aug. 9, 2016, issued in connection with U.S. Appl. No. 14/617604, filed Feb. 9, 2015, 13 pages.
Non-Final Office Action dated Jul. 26, 2017, issued in connection with U.S. Appl. No. 15/607,507, filed May 28, 2017, 21 pages.
Notice of Allowance dated Apr. 10, 2017, issued in connection with U.S. Appl. No. 14/617,604, filed Feb. 9, 2015, 7 pages.
Notice of Allowance dated Feb. 6, 2018, issued in connection with U.S. Appl. No. 15/607,507, filed May 28, 2017, 8 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

\* cited by examiner

|  | Audio Stream 604 | Audio Stream 606 | Raw Audio Signal 617 | Clipped Audio Signal 619 | Scaled Audio Signal 621 |
|---|---|---|---|---|---|
| $T_0$ | 55 | 120 | 175 | 127 | 121 |
| $T_1$ | -60 | -120 | -180 | -128 | -125 |
| $T_2$ | -65 | 115 | 50 | 50 | 35 |
| $T_3$ | 70 | -110 | -40 | -40 | -28 |
| $T_4$ | -75 | 110 | 35 | 35 | 24 |
| ... | ... | ... | ... | ... | ... |
| $T_n$ | -85 | -100 | -185 | -128 | -128 |

FIGURE 7

SYNCHRONIZED AUDIO MIXING

CROSS-REFERENCE TO RELATED APPLICATIONS

This application is a continuation of U.S. application Ser. No. 15/607,507, titled "Synchronized Audio Mixing," filed May 28, 2017, and currently pending; U.S. application Ser. No. 15/607,507 is a continuation of U.S. application Ser. No. 14/617,604, titled "Synchronized Audio Mixing," filed Feb. 9, 2015, and issued on May 30, 2017, as U.S. Pat. No. 9,665,341. The entire contents of U.S. application Ser. Nos. 15/607,507 and 14/617,604 are incorporated herein by reference.

FIELD OF THE DISCLOSURE

The disclosure is related to consumer goods and, more particularly, to methods, systems, products, features, services, and other elements directed to media playback and/or some aspects thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIG. 7 shows example audio stream data and computation results for generating a mixed audio signal.

Figure 1:
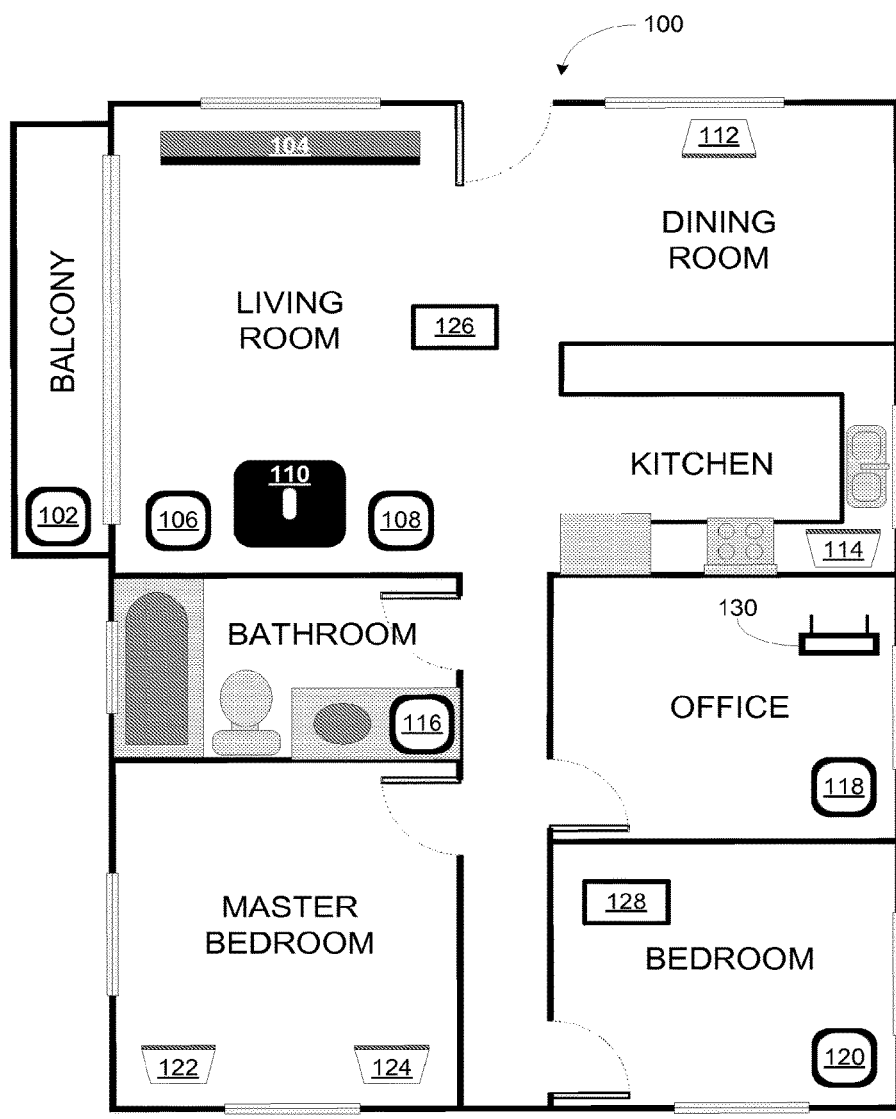
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

In various situations, a first playback device may play a mixed audio stream that includes a first audio stream and a second audio stream. It may be useful for the first playback device to play the mixed audio stream in synchrony with a second playback device that plays a mixed or unmixed audio stream that includes at least the second audio stream. In examples where both the first and second playback devices play a respective mixed audio stream, it may be advantageous for the first and second playback devices to generate their own respective mixed audio streams instead of receiving mixed audio streams from a third device.

For example, the first playback device may play a first mixed audio stream "AB" that includes an audio stream "A" and an audio stream "B." The first playback device may play the first mixed audio stream "AB" in synchrony with the second playback device playing a second mixed audio stream "BC" that includes the audio stream "B" and an audio stream "C." In some examples, this may involve a third device (e.g., a mixer or another playback device) (i) generating the first mixed audio stream "AB" and providing the first mixed audio stream "AB" to the first playback device, and (ii) generating the second mixed audio stream "BC" and providing the second mixed audio stream "BC" to the second playback device. The third device may also provide timing information to the first and second playback devices to facilitate synchronous (with respect to the audio stream "B") playback of the audio streams "AB" and "BC."

For example, initially the first playback device may be playing the audio stream "A," (e.g., classical music) and the second playback device may be playing the audio stream "C" (e.g., jazz music). Then, the first playback device may begin playing the first mixed audio stream "AB" and the second playback device may begin playing back the second mixed audio stream "BC." In this example, audio stream "B" may be an alarm ringtone. The result of this process may be that the first playback device plays the first mixed audio stream that includes classical music and the alarm ringtone, while the second playback device plays the second mixed audio stream that includes jazz music and the alarm ringtone. Notwithstanding that the first playback device may play the classical music without regard to playback of the jazz music by the second playback device, the first and second playback devices may play the alarm ringtone in synchrony.

However, it is possible that generating both the first mixed audio stream "AB" and the second mixed audio stream "BC" may consume a substantial amount (or all) of the processing capacity of the third device. Therefore, it may be desirable to have the first and second playback devices generate their own respective mixed audio streams using their own respective processor(s). The first and second playback devices generating their own respective mixed audio streams may enable processing capacity of the third device to be used for other applications.

Accordingly, some examples described herein involve, among other things, a first playback device (i) playing a first audio stream while also (ii) playing a second audio stream in synchrony with a second playback device. The first and second playback devices may both access common timing information that facilitates synchronous playback of the second audio stream by the first and second playback devices. Other aspects of the examples will be made apparent in the remainder of the description herein.

In one aspect, a first example playback device includes one or more processors and a non-transitory computer-readable medium storing instructions that, when executed by the one or more processors, cause the first playback device to perform functions. The functions include generating a mixed audio signal comprising one or more components of a first audio stream and one or more components of a second audio stream; and playing the mixed audio signal, where the one or more components of the second audio stream of the mixed audio signal played by the first playback device are played in synchrony with a second playback device configured to play the second audio stream.

In yet another aspect, an example non-transitory computer-readable medium stores instructions that, when executed by a first playback device, cause the first playback device to perform functions. The functions include generating a mixed audio signal comprising one or more components of a first audio stream and one or more components of a second audio stream; and playing the mixed audio signal, where the one or more components of the second audio stream of the mixed audio signal played by the first playback device are played in synchrony with a second playback device configured to play the second audio stream.

In yet another aspect, an example method includes generating, by a first playback device, a mixed audio signal comprising one or more components of a first audio stream and one or more components of a second audio stream; and playing, by the first playback device, the mixed audio signal, where the one or more components of the second audio stream of the mixed audio signal played by the first playback device are played in synchrony with a second playback device configured to play the second audio stream.

It will be understood by one of ordinary skill in the art that this disclosure includes numerous other embodiments. While some examples described herein may refer to functions performed by given actors such as "users" and/or other entities, it should be understood that this is for purposes of explanation only. The claims should not be interpreted to require action by any such example actor unless explicitly required by the language of the claims themselves.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102, 104, 106, 108, 110, 112, 114, 116, 118, 120, 122, and 124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
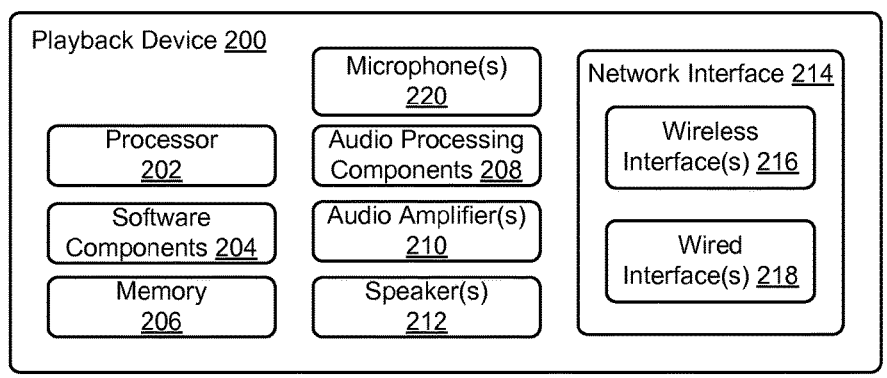
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 might not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The microphone(s) 220 may include an audio sensor configured to convert detected sounds into electrical signals. The electrical signal may be processed by the audio processing components 208 and/or the processor 202. The microphone(s) 220 may be positioned in one or more orientations at one or more locations on the playback device 200. The microphone(s) 220 may be configured to detect sound within one or more frequency ranges. In one case, one or more of the microphone(s) 220 may be configured to detect sound within a frequency range of audio that the playback device 200 is capable or rendering. In another case, one or more of the microphone(s) 220 may be configured to detect sound within a frequency range audible to humans. Other examples are also possible.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being played by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
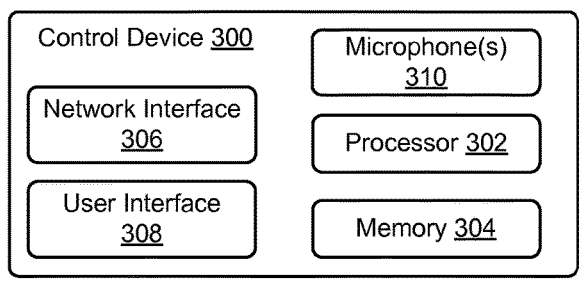
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™ iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

The microphone(s) 310 may include an audio sensor configured to convert detected sounds into electrical signals. The electrical signal may be processed by the processor 302. In one case, if the control device 300 is a device that may also be used as a means for voice communication or voice recording, one or more of the microphone(s) 310 may be a microphone for facilitating those functions. For instance, the one or more of the microphone(s) 310 may be configured to detect sound within a frequency range that a human is capable of producing and/or a frequency range audible to humans. Other examples are also possible.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
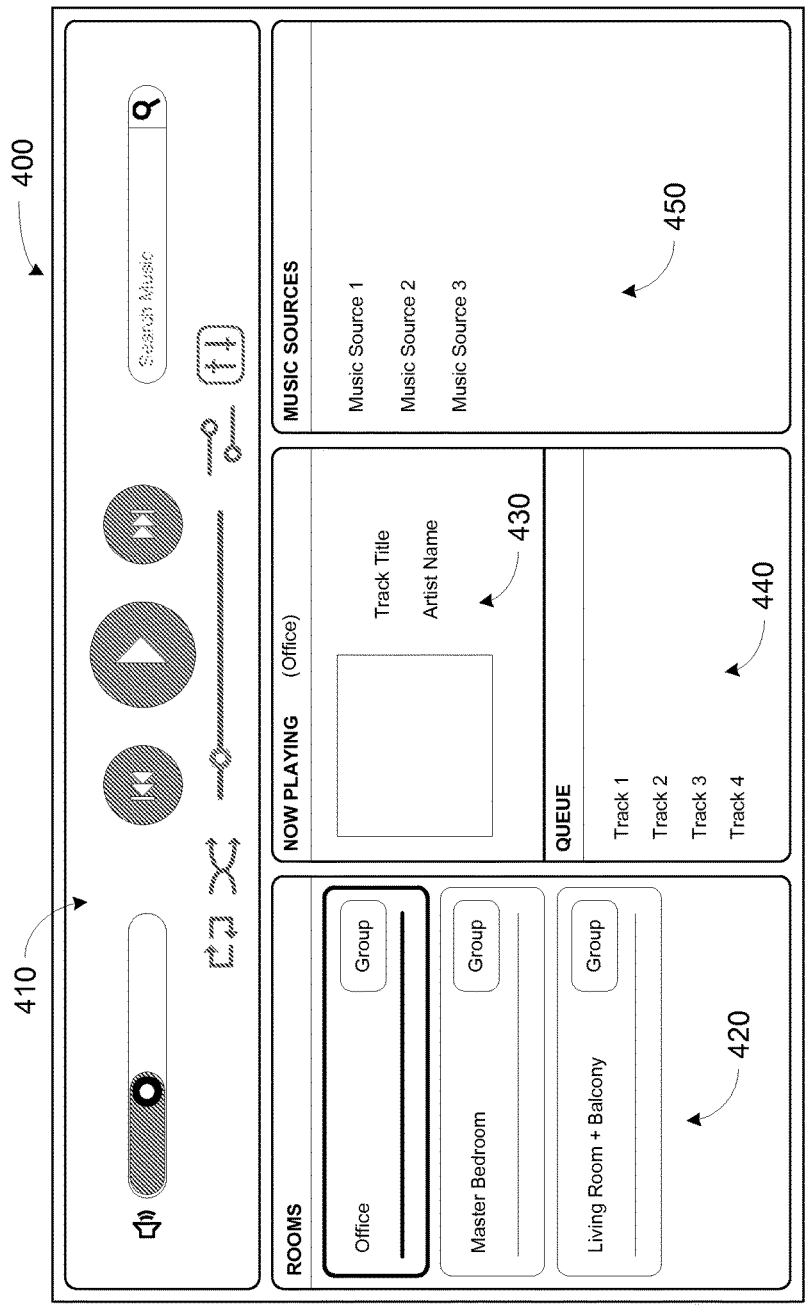
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3

(and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Example Methods Related to Synchronized Audio Mixing

As discussed above, some examples described herein involve, among other things, a first playback device (i) playing a first audio stream while also (ii) playing a second audio stream in synchrony with a second playback device. The first and second playback devices may both access common timing information that facilitates synchronous playback of the second audio stream by the first and second playback devices. Other aspects of the examples will be made apparent in the remainder of the description herein.

Figure 5:
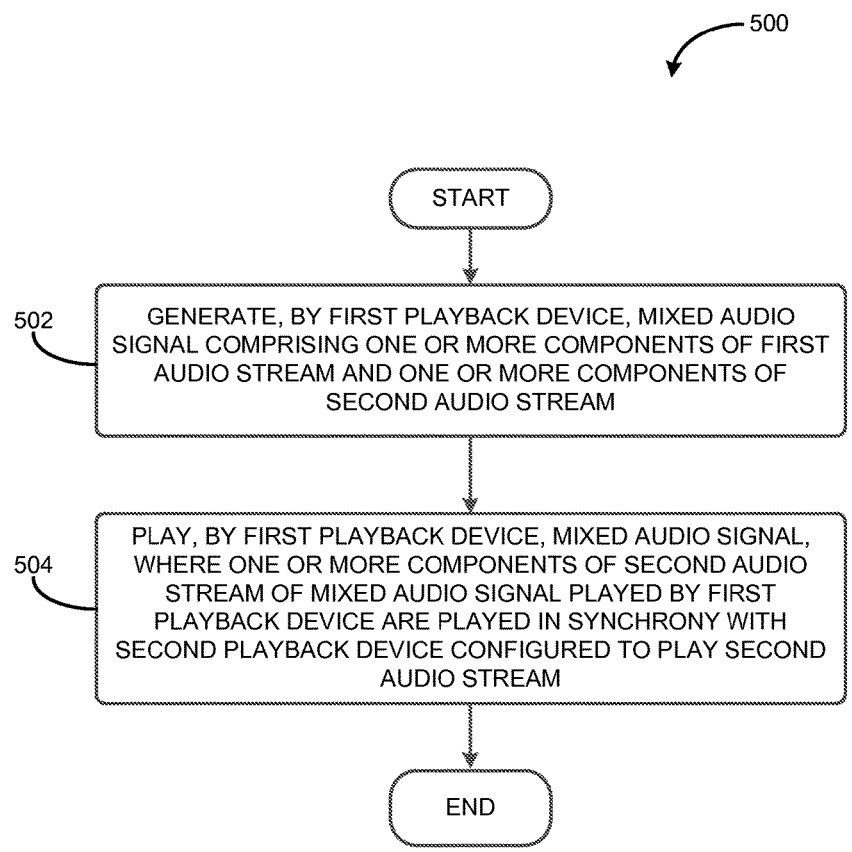
FIG. 5 shows a flow diagram for an example method.

Method 500 shown in FIG. 5 presents an example method that can be implemented within an operating environment involving, for example, the media playback system 100 of FIG. 1, one or more of the playback device 200 of FIG. 2, and one or more of the control device 300 of FIG. 3. Method 500 may include one or more operations, functions, or actions as illustrated by one or more of blocks 502 and 504. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache, and Random Access Memory (RAM). The computer-readable medium may also include non-transitory media, such as secondary or persistent long-term storage, like read-only memory (ROM), optical or magnetic disks, compact-disc read-only memory (CD-ROM), for example. The computer-readable media may also be any other volatile or non-volatile storage systems. The computer-readable medium may be considered a computer-readable storage medium, for example, or a tangible storage device. In addition, for the method 500 and other processes and methods disclosed herein, each block in FIG. 5 may represent circuitry that is wired to perform the specific logical functions in the process.

Figure 6:
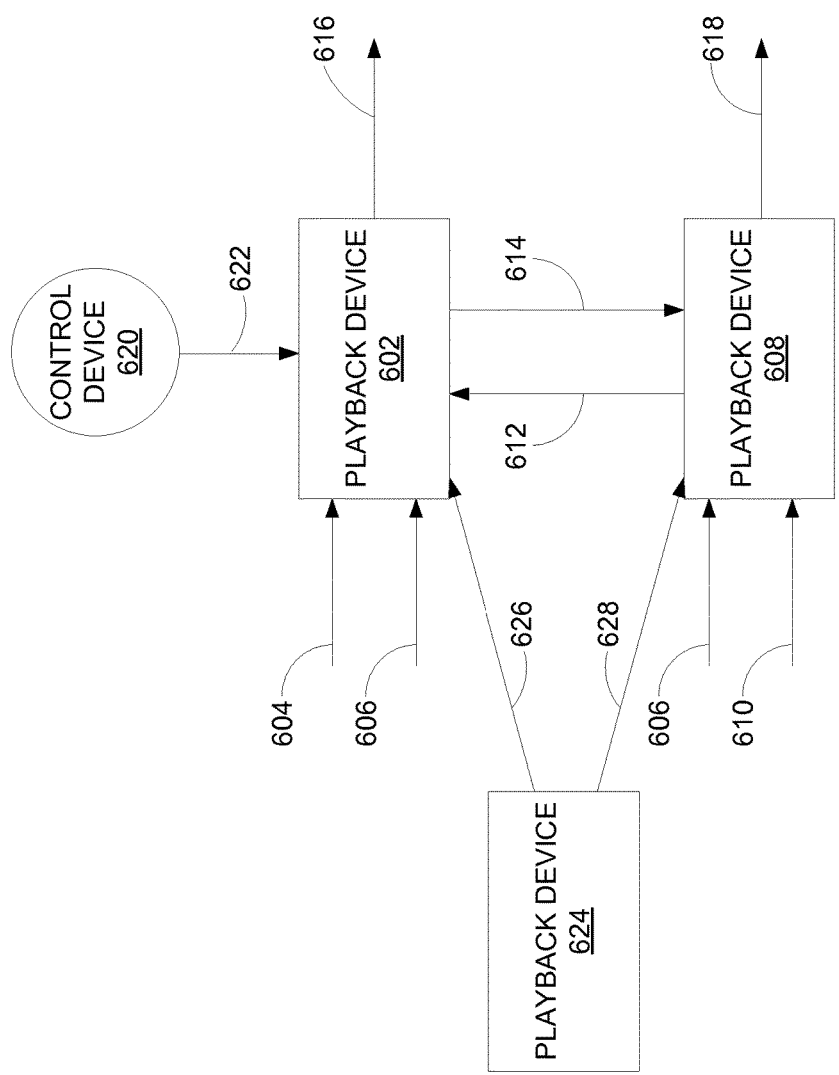
FIG. 6 shows example functions of playback devices.

At block 502, the method 500 involves generating, by a first playback device, a mixed audio signal comprising one or more components of a first audio stream and one or more components of a second audio stream. Referring to FIG. 6 as an example, a playback device 602 may receive (or otherwise access) an audio stream 604 and an audio stream 606. The playback device 602 may use the audio stream 604 and the audio stream 606 to generate a mixed audio signal 616 that includes components of the audio stream 604 and components of the audio stream 606. The playback device 602 may provide the mixed audio signal 616 to one or more speakers of the playback device 602.

In some examples, the playback device 602 may provide the mixed audio signal 616 to a digital-to-analog converter (DAC) (not shown) for converting the mixed audio signal 616 to an analog signal. For example, the DAC may provide the analog signal to one or more speakers that are integrated within the playback device 602. In another example, the DAC may provide the analog signal via one or more line out connections to one or more external speakers. In other examples, the external speakers may include integrated DACs and the mixed audio signal 616 may be provided directly to the external speakers by the playback device 602. The playback device 608 may perform similar operations with the audio signal 618.

In some examples, generating the mixed audio signal may include, for each time of a set of sample times, determining a respective sum of (i) a first sample of the first audio stream that corresponds to the given sample time and (ii) a second sample of the second audio stream that corresponds to the given sample time. For instance, the first audio stream 604 may comprise data packets that include a collection of samples that digitally quantize a waveform that embodies the first audio stream 604. The second audio stream 606 may similarly comprise data packets that include a different collection of samples that digitally quantize a waveform that embodies the second audio stream 606.

Referring to FIG. 7, for example, the audio stream 604 may include a collection of 8-bit values (e.g., corresponding to a decimal range of −128-127) that quantize the waveform of audio stream 604 at "n" respective times $T_0$, $T_1$, $T_2$, $T_3$, $T_4$, . . . and $T_n$. (Audio streams having bit depths other than 8-bit, such as 16-bit, are also possible.) The audio stream 606 may similarly include a collection of 8-bit values that quantize the waveform of the audio stream 606 at the respective times $T_0, T_1, T_2, T_3, T_4, \ldots$ and $T_n$. Purely by way of example, "n" may be equal to 128. This would mean that the playback device 602 generates the mixed audio signal 616 128 samples at a time. Assuming a sample rate of 44.1 kHz (other examples are possible), the playback device 602 may generate a new 128-sample portion of the mixed audio signal 616 approximately every 3 milliseconds.

As shown in FIG. 7, the mixed audio signal 616 may be generated (at least initially) as a "raw" audio signal 617. For example, the playback device 602 may determine sums of the audio streams 604 and 606 at the respective times $T_0, T_1, T_2, T_3, T_4, \ldots$ and $T_n$. At $T_0$, the sum of the audio streams 604 and 606 may be equal to 175 (55+120). At $T_1$, the sum of the audio streams 604 and 606 may be equal to −180 (−60−120). At $T_2$, the sum of the audio streams 604 and 606 may be equal to 50 (−65+115). At $T_3$, the sum of the audio streams 604 and 606 may be equal to −40 (70−110). At $T_4$, the sum of the audio streams 604 and 606 may be equal to 35 (−75+110). At $T_n$, the sum of the audio streams 604 and 606 may be equal to −185 (−85−100). In situations where each of the values of the raw audio signal 617 respectively corresponding to the times $T_0, T_1, T_2, T_3, T_4, \ldots$ and $T_n$ is within the dynamic range of the playback device 602 (e.g., −128-127) the mixed audio signal 616 played by the playback device 602 may be equal to the raw audio signal shown 617.

Generating the mixed audio signal may further include determining that a particular sum corresponding to a particular sample time of the set of sample times is outside of a dynamic range of the first playback device; and generating a sample of the mixed audio signal that corresponds to the particular time, where the generated sample is within the dynamic range of the first playback device. For example, the playback device 602 may determine that the sum "175" of the raw audio signal 617 corresponding to $T_0$ is greater than an upper limit (e.g., 127) of the dynamic range of the playback device 602. The playback device 602 may then generate a sample of a "clipped" audio signal 619 having a value of 127 corresponding to $T_0$. In some examples, the playback device 602 may generate a sample for the clipped audio signal 619 having a value (e.g., 120) that is within, but does not correspond to a limit of, the dynamic range of the playback device 602. When one or more values of the raw audio signal 617 fall outside of the dynamic range of the playback device 602, the clipped audio signal 619 depicted in FIG. 7 may be used as the mixed audio signal 616.

By further example, the playback device 602 may determine that the sum −180 of the raw audio signal 617 corresponding to $T_1$ is less than a lower limit (e.g., −128) of the dynamic range of the playback device 602. The playback device 602 may then generate a sample of the clipped audio signal 619 having a value of −128 corresponding to $T_1$. This process of identifying values of the raw audio signal 617 that fall outside of the dynamic range of the playback device 602 and replacing the identified values with values corresponding to the upper or lower limit of the dynamic range may be referred to as "clipping." Clipping may preserve loudness of audio output while introducing some degree of signal distortion. Clipping may be useful when values of the raw audio signal 617 only occasionally exceed the dynamic range of the playback device 602.

Generating the mixed audio signal may further include determining that a particular sum corresponding to a particular sample time of the set of sample times is outside of a dynamic range of the first playback device; determining a scaling factor; and for each of the sample times of the set of sample times, scaling the sum corresponding to the given sample time by the scaling factor. For example, the playback device 602 may determine that the sum "−185" corresponding to $T_n$ may have the largest magnitude of any sample of the raw audio signal 617. The playback device 602 may then determine a scaling factor that, when applied to all values of the raw audio signal 617, yields values respectively corresponding to each of the times $T_0, T_1, T_2, T_3, T_4, \ldots$ and $T_n$ that are all within the dynamic range (e.g., −128-127) of the playback device 602.

As shown in FIG. 7, the playback device 602 may multiply the values of the raw audio signal 617 by a scaling factor of approximately 0.692 (−128/−185) to yield respective values of a scaled audio signal 621. For example, the sum 175 corresponding to $T_0$ scales to 121 (175*0.692), the sum −180 corresponding to $T_1$ scales to −125 (−125*0.692), the sum 50 corresponding to $T_2$ scales to 35 (50*0.692), the sum −40 corresponding to $T_3$ scales to −28 (−40*0.692), the sum 35 corresponding to $T_4$ scales to 24 (35*0.692), and the sum −185 corresponding to $T_n$ scales to −128. Scaling a raw audio signal to generate a mixed audio signal may be useful when the raw audio signal often exceeds the dynamic range of the playback device. In this context, the scaled audio signal 621 depicted in FIG. 7 may be used as the mixed audio signal 616.

Figure 8:
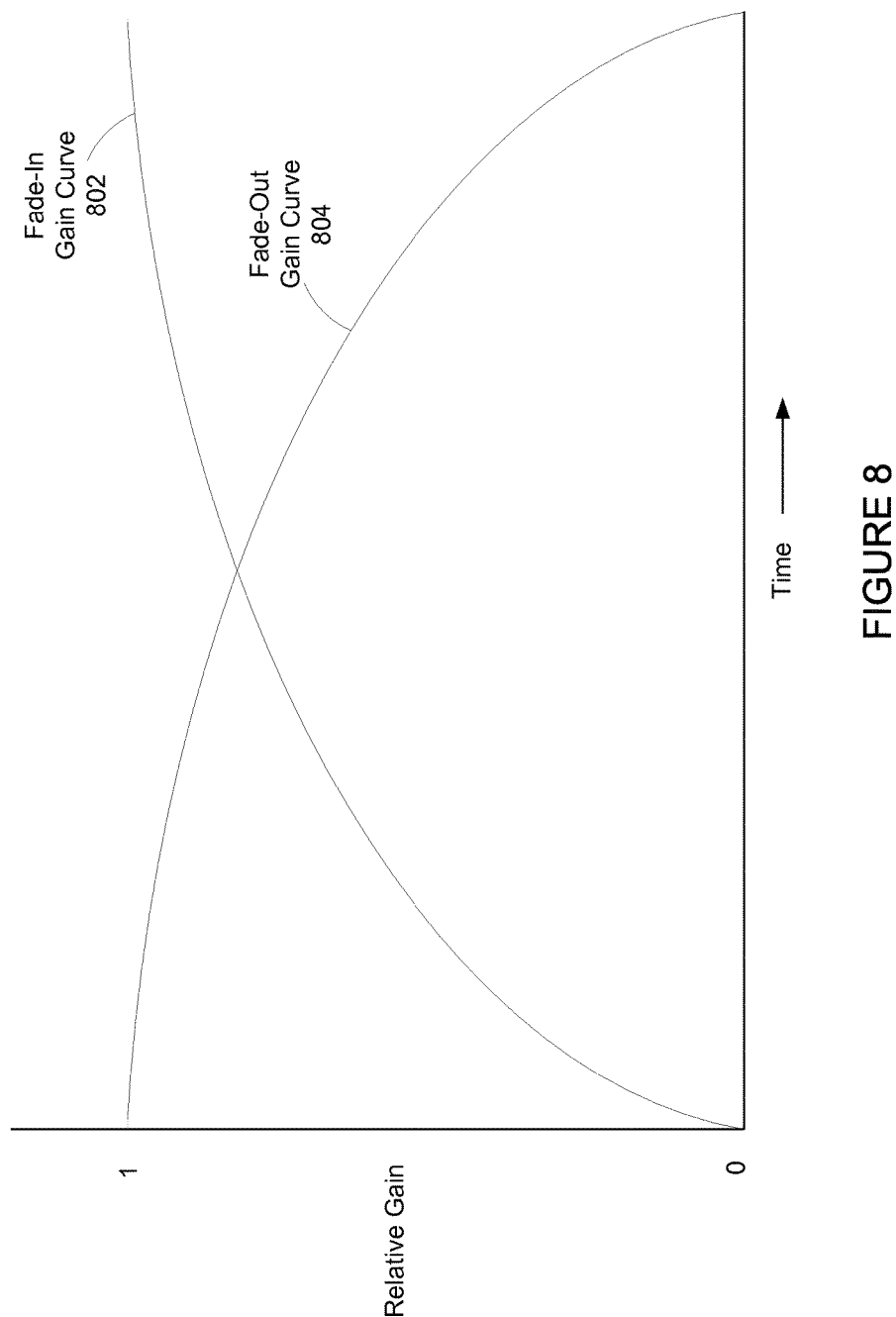
FIG. 8 shows an example fade-in gain curve and an example fade-out gain curve.

In some examples, the mixed audio signal comprises (i) a first portion of the first audio stream that fades out as the mixed audio signal is played and (ii) a portion of the second audio stream that fades in as the mixed audio signal is played. In other examples, the mixed audio signal comprises (i) a portion of the first audio stream that fades in as the mixed audio signal is played and (ii) a portion of the second audio stream that fades out as the mixed audio signal is played. These methods may involve generating a "cross-faded" mixed audio signal by applying a fade-in gain curve or a fade-out gain curve respectively to the first audio stream and the second audio stream, as appropriate. An example fade-in gain curve 802 and an example fade-out gain curve 804 are shown in FIG. 8.

Referring to FIG. 6, a playback device 608 may also receive (or otherwise access) the audio stream 606 and, in some examples, an audio stream 610. The playback device 608 may play an audio signal 618 that in some examples may be equivalent to the audio stream 606, but in other examples may be a mixed audio signal generated by the playback device 608 to include components of both audio streams 606 and 610. The audio stream 610 may be equivalent to the audio stream 604, but in other examples may be an audio stream different from the audio stream 604. The playback device 608 may play the audio stream 610 in synchrony with another playback device, such as playback device 624. The playback device 608 need not (but could) play audio stream 610 in synchrony with the playback device 602 playing audio stream 604.

At block 504, the method 500 involves playing, by the first playback device, the mixed audio signal, where the one or more components of the second audio stream of the mixed audio signal played by the first playback device are played in synchrony with a second playback device configured to play the second audio stream. For example, the playback device 602 may play the mixed audio signal 616 as the playback device 608 plays the audio signal 618, such that the components of the audio stream 606 played by the playback device 602 are played in synchrony with the components of the audio stream 606 played by the playback device 608.

In some examples, the first playback device 602 playing the components of the audio stream 606 in synchrony with the playback device 608 may mean that, at any given time, the playback device 602 and the playback device 608 are playing the same component of the audio stream 606. In other examples, the playback device 602 may play the audio stream 606 with a predetermined or perhaps dynamically calculated delay time or lead time when compared to the playback device 608 playing the audio stream 606. In this context, playing the audio stream 606 in "synchrony" means that there may be a predetermined or perhaps dynamically calculated lead time or delay time (possibly zero) between the playback devices 602 and 608 playing a given component of the audio stream 606. Descriptions of multiple playback devices playing one or more audio streams in synchrony may be found within U.S. Pat. No. 8,234,395, which is hereby incorporated by reference. Such disclosure may be found, for example and without limitation, at col. 9 through col. 36.

Further operations related to the method 500 may involve receiving timing information from a third playback device, where playing the mixed audio signal comprises playing the mixed audio signal at a time based on the timing information. For example, the playback device 602 may receive timing information 626 from a playback device 624. The playback device 608 may receive timing information 628 (which could be the same as timing information 626) from the playback device 624. The timing information 626 and 628 may each include a timestamp (e.g., indicating respective times to initiate playback of the audio stream 606), or the like, that the playback devices 602 and 608 may respectively use, in coordination with respective clocks of the playback devices 602 and 608, to play the components of the audio stream 606 in synchrony.

Similarly, in instances where the playback device 608 is playing audio stream 610 in synchrony with an additional playback device (e.g., playback device 624) playing audio stream 610, the playback device 608 may receive timing information for playback of audio stream 610 from the additional playback device and may receive timing information for playback of audio stream 606 from playback device 602. Other examples are possible.

Further operations related to the method 500 may involve receiving timing information from the second playback device, where playing the mixed audio signal comprises playing the mixed audio signal at a time based on the timing information. For example, the playback device 602 may receive timing information 612 from the playback device 608. The timing information 612 may include a timestamp (e.g., indicating a time to initiate playback of the audio stream 606), or the like, that the playback devices 602 and 608 may use, in coordination with respective clocks of the playback devices 602 and 608, to play the components of the audio stream 606 in synchrony.

Further operations related to the method 500 may involve sending timing information to the second playback device, where the first playback device and the second playback device play the second audio stream in synchrony based on the timing information. For example, the playback device 602 may send timing information 614 to the playback device 608. The timing information 614 may include a timestamp (e.g., indicating a time to initiate playback of the audio stream 606), or the like, that the playback devices 602 and 608 may use, in coordination with respective clocks of the playback devices 602 and 608, to play the components of the audio stream 606 in synchrony.

Further operations related to the method 500 may involve playing the first audio stream; receiving a command to fade out the first audio stream and fade in the second audio stream; and generating the mixed audio signal based on receiving the command, where the mixed audio signal comprises (i) a portion of the first audio stream that fades out as the mixed audio signal is played and (ii) a portion of the second audio stream that fades in as the mixed audio signal is played. For example, the playback device 602 may (i) play the audio stream 604, (ii) receive a command 622 from a control device 620 (or another device) to fade out the audio stream 604 and fade in the audio stream 606, and (iii) generate the mixed audio signal 616 based on receiving the command 622. In this context, the mixed audio signal 616 may include a portion of the audio stream 604 that fades out as the mixed audio signal 616 is played and a portion of the audio stream 606 that fades in as the mixed audio signal 616 is played.

For instance, the command 622 may relate to a command to "skip" from playing the audio stream 604 to playing the audio stream 606. With a "cross-fade" setting enabled at the playback device 602, such a command may implicitly include a command to fade out the audio stream 604 and fade in the audio stream 606, while playing the audio stream 606 in synchrony with the playback device 608.

Further operations related to the method 500 may involve playing the second audio stream; receiving a command to fade out the second audio stream and fade in the first audio stream; and generating the mixed audio signal based on receiving the command, where the mixed audio signal comprises (i) a portion of the first audio stream that fades in as the mixed audio signal is played and (ii) a portion of the second audio stream that fades out as the mixed audio signal is played. For example, the playback device 602 may (i) play the audio stream 606, (ii) receive a command 622 from the control device 620 (or another device) to fade out the audio stream 606 and fade in the audio stream 604, and (iii) generate the mixed audio signal 616 based on receiving the command 622. In this context, the mixed audio signal 616 may include a portion of the audio stream 604 that fades in as the mixed audio signal 616 is played and a portion of the audio stream 606 that fades out as the mixed audio signal 616 is played.

For instance, the command 622 may correspond with a command to "skip" from playing the audio stream 606 to playing the audio stream 604. With a "cross-fade" setting enabled at the playback device 602, such a command may implicitly include a command to fade out the audio stream 606 and fade in the audio stream 604, while playing the audio stream 606 in synchrony with the playback device 608.

In some examples, the second audio stream follows the first audio stream in a playback queue of the first playback device. In this context, further operations related to the method 500 may involve playing the first audio stream; determining that playback of the first audio stream will be completed within a threshold duration of time; and generating the mixed audio signal in response to determining that playback of the first audio stream will be completed within the threshold duration of time.

For instance, the audio stream 606 may follow the audio stream 604 in a playback queue of the playback device 602. The playback device 602 may (i) play the audio stream 604, (ii) determine that playback of the audio stream 604 will be completed within a threshold duration of time (e.g., ten seconds), and (iii) generate the mixed audio signal 616 in response to determining that playback of the audio stream 604 will be completed within the threshold duration of time. That is, the playback device 602 may be configured to automatically cross-fade from the audio stream 604 to the audio stream 606 as the playback device 602 transitions from playing the audio stream 604 to playing the audio stream 606.

In other examples, the first audio stream follows the second audio stream in a playback queue of the first playback device. In this context, further operations related to the method 500 may involve playing the second audio stream; determining that playback of the second audio stream will be completed within a threshold duration of time; and generating the mixed audio signal in response to determining that the second audio stream will be completed within the threshold duration of time.

For instance, the audio stream 604 may follow the audio stream 606 in a playback queue of the playback device 602. The playback device 602 may (i) play the audio stream 606, (ii) determine that playback of the audio stream 606 will be completed within a threshold duration of time (e.g., ten seconds), and (iii) generate the mixed audio signal 616 in response to determining that playback of the audio stream 606 will be completed within the threshold duration of time. That is, the playback device 602 may be configured to automatically cross-fade from the audio stream 606 to the audio stream 604 as the playback device 602 transitions from playing the audio stream 606 to playing the audio stream 604.

In some examples, the first audio stream corresponds to a first channel of multi-channel audio content and the second audio stream corresponds to a second channel of the multi-channel audio content. For example, the audio stream 604 may correspond to a front-left channel of 5.1-channel audio content that includes front-left, front-center, front-right, rear-left, rear-right, and subwoofer channels. The playback device 602 may correspond to a front-left speaker in a 4.1-channel audio system that includes front-left, front-right, rear-left, rear-right, and subwoofer channels (but not a front-center channel). The audio stream 606 may correspond to the center-front channel of the 5.1-channel audio content and it may be useful to mix the audio stream 606 with the audio stream 604 at the playback device 602 so that the playback device 602 may play the front-center audio channel in duplicate with the playback device 608 (which may correspond to the front-right channel of the 4.1-channel audio system).

In other examples, the first audio stream corresponds to a channel of multi-channel audio content and the second audio stream is monaural audio content. For instance, the playback device 602 may correspond to a left channel of a stereo pair and the playback device 608 may correspond to a right channel of the stereo pair. As the playback device 602 plays a left channel of audio (e.g., the audio stream 604) and the playback device 608 plays a right channel of audio (e.g., the audio stream 610), it may be useful for the playback devices 602 and 608 to play a monaural audio stream (e.g., the audio stream 606) in synchrony.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Examples described herein involve, among other things, a first playback device (i) playing a first audio stream while also (ii) playing a second audio stream in synchrony with a second playback device. The first and second playback devices may both access common timing information that facilitates synchronous playback of the second audio stream by the first and second playback devices. Other aspects of the examples will be made apparent in the remainder of the description herein.

In one aspect, a first example playback device includes one or more processors and a non-transitory computer-readable medium storing instructions that, when executed by the one or more processors, cause the first playback device to perform functions. The functions include generating a mixed audio signal comprising one or more components of a first audio stream and one or more components of a second audio stream; and playing the mixed audio signal, where the one or more components of the second audio stream of the mixed audio signal played by the first playback device are played in synchrony with a second playback device configured to play the second audio stream.

In yet another aspect, an example non-transitory computer-readable medium stores instructions that, when executed by a first playback device, cause the first playback device to perform functions. The functions include generating a mixed audio signal comprising one or more components of a first audio stream and one or more components of a second audio stream; and playing the mixed audio signal, where the one or more components of the second audio stream of the mixed audio signal played by the first playback device are played in synchrony with a second playback device configured to play the second audio stream.

In yet another aspect, an example method includes generating, by a first playback device, a mixed audio signal comprising one or more components of a first audio stream and one or more components of a second audio stream; and playing, by the first playback device, the mixed audio signal, where the one or more components of the second audio stream of the mixed audio signal played by the first playback device are played in synchrony with a second playback device configured to play the second audio stream.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A method of operating a media playback system comprising a first computing device, a second computing device, and a third computing device, the method comprising:
    at the first computing device, generating a first mixed audio signal comprising a first audio stream received from a first audio source and a third audio stream received from a third audio source, wherein the first audio stream is different from the third audio stream;
    at the second computing device, generating a second mixed audio signal comprising a second audio stream received from a second audio source and the third audio stream received from the third audio source, wherein the second audio stream is different than the first audio stream and the third audio stream;
    at the first computing device, playing the first mixed audio signal, wherein playing the first mixed audio signal comprises playing the third audio stream in synchrony with playback of the third audio stream by the second computing device based on playback timing for the third audio stream received from the third computing device; and
    at the second computing device, playing the second mixed audio signal, wherein playing the second mixed audio signal comprises playing the third audio stream in synchrony with playback of the third audio stream by the first computing device based on playback timing for the third audio stream received from the third computing device.

2. The method of claim 1, wherein the first audio source comprises at least one of a first uniform resource identifier (URI) or uniform resource locator (URL), and wherein the second audio source comprises at least one of a second URI or URL.

3. The method of claim 2, wherein the third computing device comprises the third audio source.

4. The method of claim 1, wherein generating the first mixed audio signal comprises, at a first sample time, determining a sum of (i) a sample of the first audio stream at the first sample time and (ii) a sample of the third audio stream at the first sample time.

5. The method of claim 4, wherein generating the first mixed audio signal further comprises:
    determining, for the first sample time, that the sum of the sample of the first audio stream at the first sample time and the sample of the third audio stream at the first sample time would be outside of a dynamic range of the first computing device; and
    in response determining, for the first sample time that the sum of the sample of the first audio stream at the first sample time and the sample of the third audio stream at the first sample time would be outside of the dynamic range of the first computing device, generating a sample of the first mixed audio signal at the first sample time that is within the dynamic range of the first computing device.

6. The method of claim 5, wherein generating the sample of the first mixed audio signal at the first sample time that is within the dynamic range of the first computing device comprises scaling the sum of the sample of the first audio stream at the first sample time and the sample of the third audio stream at the first sample time by a scaling factor.

7. The method of claim 1 further comprising:
    at the first computing device, receiving the playback timing for the third audio stream from the third computing device, wherein the playback timing comprises data indicative of a first time to initiate playback on the first computing device of at least a first component of the third audio stream, and
    at the second computing device, receiving the playback timing for the third audio stream from the third computing device, wherein the playback timing comprises data indicative of the first time to initiate playback on the second computing device of at least the first component of the third audio stream.

8. The method of claim 1, further comprising:
    sending timing information to the first computing device and the second computing device, wherein the first computing device and the second computing device use the timing information to play the third audio stream in synchrony with each other.

9. The method of claim 1, wherein playing the first mixed audio signal at the first computing device comprises fading in a portion of the third audio stream into the first mixed audio signal, and wherein playing the second mixed audio signal at the second computing device comprises fading in the portion of the third audio stream into the second mixed audio signal.

10. The method of claim 1, wherein playing the first mixed audio signal at the first computing device comprises fading out a portion of the third audio stream from the first mixed audio signal, and wherein playing the second mixed audio signal at the second computing device comprises fading out the portion of the third audio stream from the second mixed audio signal.

11. The method of claim 1, wherein playing the first mixed audio signal at the first computing device comprises (i) fading out a portion of the first audio stream from the first mixed audio signal and (ii) fading in a portion of the third audio stream into the first mixed audio signal.

12. The method of claim 1, wherein playing the second mixed audio signal at the second computing device comprises (i) fading out a portion of the second audio stream from the second mixed audio signal and (ii) fading in a portion of the third audio stream into the second mixed audio signal.

13. The method of claim 1, further comprising:
    receiving a command at the first computing device to fade out the first audio stream and fade in the third audio stream; and
    in response to receiving the command at the first computing device to fade out the first audio stream and fade in the third audio stream, generating the first mixed audio signal comprising (i) a portion of the first audio stream that fades out as the first mixed audio signal is played and (ii) a portion of the third audio stream that fades in as the first mixed audio signal is played.

14. The method of claim 1, further comprising:
receiving a command at the second computing device to fade out the second audio stream and fade in the third audio stream; and
in response to receiving the command at the second computing device to fade out the second audio stream and fade in the third audio stream, generating the second mixed audio signal comprising (i) a portion of the second audio stream that fades out as the second mixed audio signal is played and (ii) a portion of the third audio stream that fades in as the second mixed audio signal is played.

15. Tangible, non-transitory computer-readable media comprising instructions encoded thereon, wherein the instructions, when executed by one or more processors, cause a media playback system comprising a first computing device, a second computing device, and a third computing device, to perform a method comprising:
at the first computing device, generating a first mixed audio signal comprising a first audio stream received from a first audio source and a third audio stream received from a third audio source, wherein the first audio stream is different from the third audio stream;
at the second computing device, generating a second mixed audio signal comprising a second audio stream received from a second audio source and the third audio stream received from the third audio source, wherein the second audio stream is different than the first audio stream and the third audio stream;
at the first computing device, playing the first mixed audio signal, wherein playing the first mixed audio signal comprises playing the third audio stream in synchrony with playback of the third audio stream by the second computing device based on playback timing for the third audio stream received from the third computing device; and
at the second computing device, playing the second mixed audio signal, wherein playing the second mixed audio signal comprises playing the third audio stream in synchrony with playback of the third audio stream by the first computing device based on playback timing for the third audio stream received from the third computing device.

16. The tangible, non-transitory computer-readable media of claim 15, wherein the first audio source comprises at least one of a first uniform resource identifier (URI) or uniform resource locator (URL), and wherein the second audio source comprises at least one of a second URI or URL.

17. The tangible, non-transitory computer-readable media of claim 16, wherein the third computing device comprises the third audio source.

18. The tangible, non-transitory computer-readable media of claim 15, wherein generating the first mixed audio signal comprises, at a first sample time, determining a sum of (i) a sample of the first audio stream at the first sample time and (ii) a sample of the third audio stream at the first sample time.

19. The tangible, non-transitory computer-readable media of claim 18, wherein generating the first mixed audio signal further comprises:
determining, for the first sample time, that the sum of the sample of the first audio stream at the first sample time and the sample of the third audio stream at the first sample time would be outside of a dynamic range of the first computing device; and
in response determining, for the first sample time that the sum of the sample of the first audio stream at the first sample time and the sample of the third audio stream at the first sample time would be outside of the dynamic range of the first computing device, generating a sample of the first mixed audio signal at the first sample time that is within the dynamic range of the first computing device.

20. The tangible, non-transitory computer-readable media of claim 19, wherein generating the sample of the first mixed audio signal at the first sample time that is within the dynamic range of the first computing device comprises scaling the sum of the sample of the first audio stream at the first sample time and the sample of the third audio stream at the first sample time by a scaling factor.

21. The tangible, non-transitory computer-readable media of claim 15, wherein the method further comprises:
at the first computing device, receiving the playback timing for the third audio stream from the third computing device, wherein the playback timing comprises data indicative of a first time to initiate playback on the first computing device of at least a first component of the third audio stream, and
at the second computing device, receiving the playback timing for the third audio stream from the third computing device, wherein the playback timing comprises data indicative of the first time to initiate playback on the second computing device of at least the first component of the third audio stream.

22. The tangible, non-transitory computer-readable media of claim 15, wherein the method further comprises:
sending timing information to the first computing device and the second computing device, wherein the first computing device and the second computing device use the timing information to play the third audio stream in synchrony with each other.

23. The tangible, non-transitory computer-readable media of claim 15, wherein playing the first mixed audio signal at the first computing device comprises fading in a portion of the third audio stream into the first mixed audio signal, and wherein playing the second mixed audio signal at the second computing device comprises fading in the portion of the third audio stream into the second mixed audio signal.

24. The tangible, non-transitory computer-readable media of claim 15, wherein playing the first mixed audio signal at the first computing device comprises fading out a portion of the third audio stream from the first mixed audio signal, and wherein playing the second mixed audio signal at the second computing device comprises fading out the portion of the third audio stream from the second mixed audio signal.

25. The tangible, non-transitory computer-readable media of claim 15, wherein playing the first mixed audio signal at the first computing device comprises (i) fading out a portion of the first audio stream from the first mixed audio signal and (ii) fading in a portion of the third audio stream into the first mixed audio signal.

26. The tangible, non-transitory computer-readable media of claim 15, wherein playing the second mixed audio signal at the second computing device comprises (i) fading out a portion of the second audio stream from the second mixed audio signal and (ii) fading in a portion of the third audio stream into the second mixed audio signal.

27. The tangible, non-transitory computer-readable media of claim 15, further comprising:
receiving a command at the first computing device to fade out the first audio stream and fade in the third audio stream; and
in response to receiving the command at the first computing device to fade out the first audio stream and fade in the third audio stream, generating the first mixed audio signal comprising (i) a portion of the first audio stream that fades out as the first mixed audio signal is played and (ii) a portion of the third audio stream that fades in as the first mixed audio signal is played.

28. The tangible, non-transitory computer-readable media of claim 15, further comprising:

receiving a command at the second computing device to fade out the second audio stream and fade in the third audio stream; and in response to receiving the command at the second computing device to fade out the second audio stream and fade in the third audio stream, generating the second mixed audio signal comprising (i) a portion of the second audio stream that fades out as the second mixed audio signal is played and (ii) a portion of the third audio stream that fades in as the second mixed audio signal is played.

\* \* \* \* \*

UNITED STATES PATENT AND TRADEMARK OFFICE
CERTIFICATE OF CORRECTION

PATENT NO. : 10,387,110 B2
APPLICATION NO. : 15/935966
DATED : August 20, 2019
INVENTOR(S) : Lin et al.

It is certified that error appears in the above-identified patent and that said Letters Patent is hereby corrected as shown below:

On the Title Page

Item (73), in Column 1, in "Assignee:", Line 1, delete "SOHOS, Inc.," and insert -- Sonos, Inc., --, therefor.

Signed and Sealed this
Nineteenth Day of September, 2023

Katherine Kelly Vidal
*Director of the United States Patent and Trademark Office*